Figure 1:
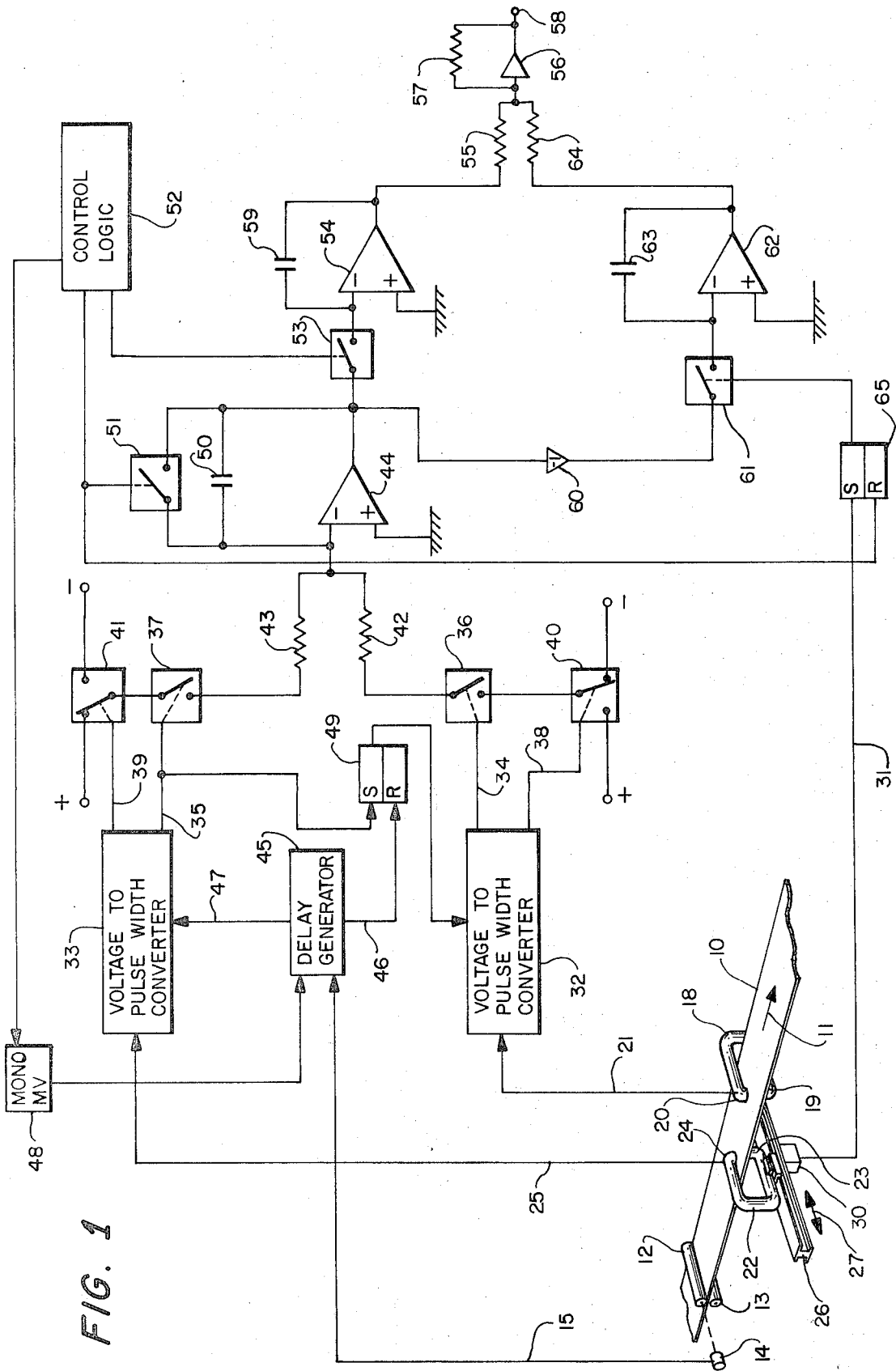

United States Patent [19]

Beckage et al.

[11] 3,822,383
[45] July 2, 1974

[54] PROFILE GAUGING SYSTEM

[75] Inventors: Thomas Beckage, Dunmore; William S. Locks, Clarks Summit, both of Pa.

[73] Assignee: Weston Instruments Inc., Newark, N.J.

[22] Filed: Apr. 13, 1973

[21] Appl. No.: 350,973

[52] U.S. Cl............... 250/308, 250/359, 250/394, 250/490
[51] Int. Cl............................................. G01t 1/00
[58] Field of Search ........... 250/308, 306, 359, 393, 250/394, 490, 312

[56] References Cited
UNITED STATES PATENTS

| | | | |
|---|---|---|---|
| 3,016,460 | 1/1962 | Andresen | 250/308 |
| 3,610,925 | 10/1971 | Brelin et al. | 250/308 |
| 3,715,592 | 2/1973 | Busch et al. | 250/359 |

*Primary Examiner*—Archie R. Borchelt
*Assistant Examiner*—Harold A. Dixon
*Attorney, Agent, or Firm*—Roylance, Abrams, Berdo & Kaul, William R. Sherman and Stewart F. Moore

[57] ABSTRACT

A thickness profile gauging apparatus, particularly for use with metal strip, in which first and second radiation sources irradiate the strip and first and second receivers detect radiation attenuated by the strip and produce signals representative of strip thickness. The receiver signals are converted into pulses having durations representative of signal amplitude and the pulses are integrated to produce a difference signal which is then sampled and held. The pulse converters are sequentially activated so that the respective receivers are gauging portions of the strip along the same transverse line, the sequential activation being controlled by a delay generator responsive to a strip velocity input signal. At least one of the radiation source-receiver pairs is transversely movable to scan the strip width and a center line switch produces a signal when the two gauges are examining portions of the strip on the same longitudinal line of the moving strip. Circuit means responsive to the center line signal causes a sample of the thickness difference information at that line to be held and provided as a drift correction signal. Subsequent difference signals are then combined with this correction signal to produce a continuous profile output, the correction signal compensating for drift in the two converters and detectors.

3 Claims, 10 Drawing Figures

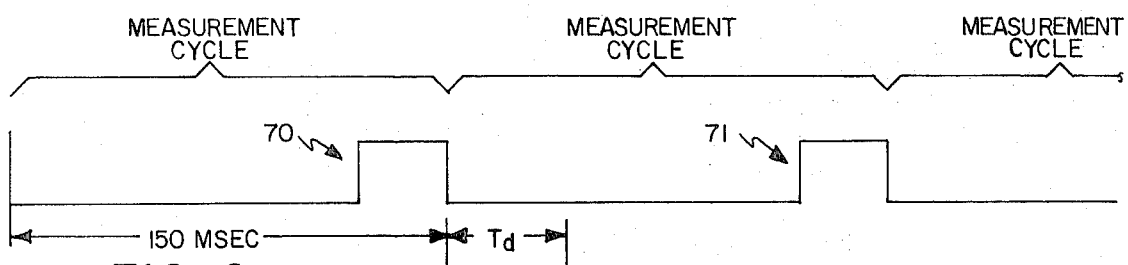
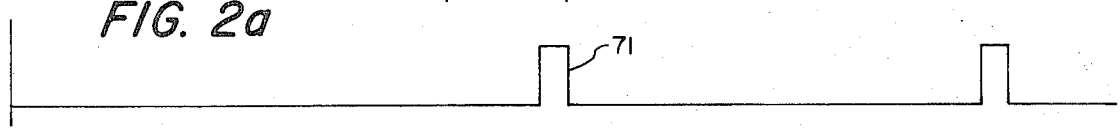
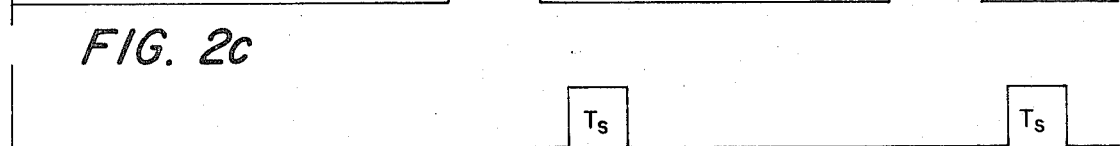
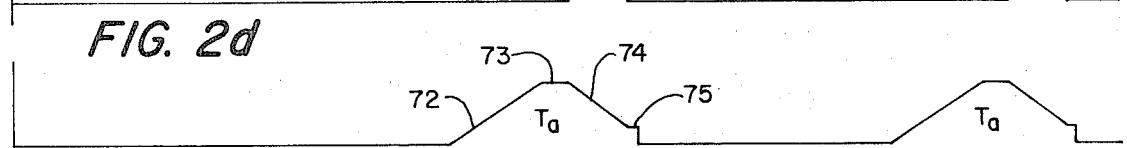
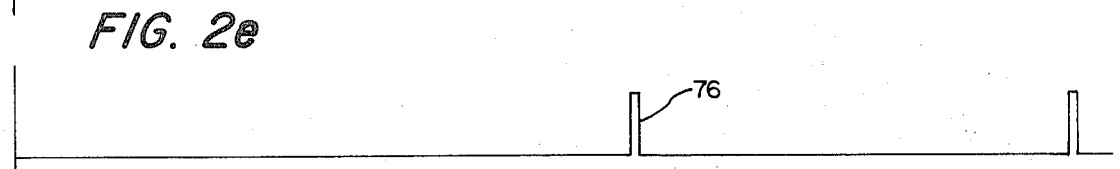
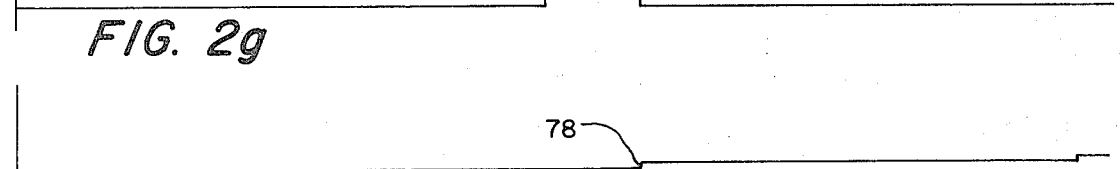
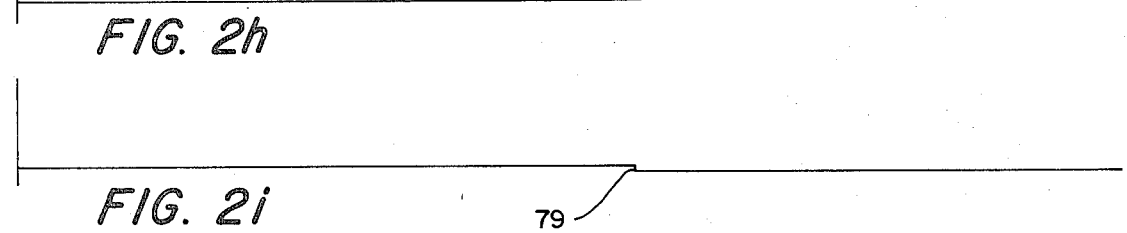

PROFILE GAUGING SYSTEM

This invention relates to thickness measuring apparatus and, more specifically, to improvements in the signal processing means for accepting electrical signals from the measuring equipment and deriving thickness deviation profile signal information.

In metal strip and other strip and web manufacture it has been common practice for several years to employ radiation equipment to measure thickness, crown, and, more generally, thickness deviation. It is also common practice to employ more than one radiation detector, usually two, one of which is generally maintained in a fixed location adjacent elongated moving web or strip of material and the other one of which is located either "upstream" or "downstream" of the first and is caused to move transversely with respect to the longitudinally moving strip.

Problems associated with correlating and interpreting the information derived from the two detectors arise from the basic fact that the detectors are not always investigating the strip at the same point at any given time, frequently never, depending upon the specific relationship of the two detectors to each other. In addition, problems of drift and instability have arisen as a result of the difficult environment in which the measurements are made.

It is, therefore, an object of the present invention to provide profile measuring apparatus with improved means for overcoming the inaccuracies resulting from drift.

It is a further object to provide an apparatus in which automatic calibration is accomplished and in which compensation is made for deviations arising from the fact that measurements are made at different locations.

Broadly described, the apparatus includes first and second source and detector units for producing signals representative of strip thickness, a device for producing a signal representative of strip velocity, first and second circuit means responsive to the thickness and velocity signals for producing pulses having durations representative of thickness signal magnitudes, the pulses being separated in time by an amount controlled by the strip velocity signal, means for algebraically combining the thickness pulse signals so that equal signals produce a zero output, means for repetitively sampling the signal thus derived to produce a signal representative of deviation profile, and means responsive to the intersection of the two scanning means at the same preselected longitudinal line for producing a correction signal to compensate for non zero readings at the same sample point due to system drift or the like.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a schematic diagram, partly in block form, of an apparatus according to the invention; and FIGS. 2a–i are wave form diagrams illustrating circuit conditions in the apparatus of FIG. 1.

Turning now to the drawings in detail, it will be seen that FIG. 1 shows a strip of material 10 which is to be examined by the scanning apparatus and thickness deviation profile of which is to be produced. The strip has longitudinal movement in the direction of arrow 11, the support and movement of the strip being accomplished by conventional apparatus, not shown. Rollers 12 and 13 associated with the strip can be engaged in the production and control of a crown or can be simply metering rolls but, in any event, are associated with and mechanically coupled to a tachometer generator 14 which produces an electrical signal on conductor 15, usually a varying DC signal, which is proportional in magnitude to the velocity of strip 10.

Associated with the strip are scanning devices for the purpose of producing and receiving radiation, which radiation passes through the strip and is attenuated thereby as a function of strip characteristics including thickness. This apparatus includes a fixed gauge 18, which is commonly referred to as the prime gauge, this gauge including a source of radiation 19 and a radiation detector 20 which produces an electrical signal on a conductor 21 representative of strip thickness.

A movable gauge 22 is also operatively associated with the strip and includes a source 23 and a detector 24 which produces an electrical signal on a conductor 25 representative of strip thickness. Gauge 22 is movable supported on a support beam 26 for reciprocating scanning movement transversely of the strip as indicated by arrows 27.

It will be recognized, first, that both gauges can be mounted in a manner which will permit transverse movement with respect to the strip and that such movement can be independently controllable. However, in subsequent discussions herein, the arrangement of one fixed and one scanning gauge will be treated. It will further be recognized that the radiation producing and receiving means commonly employed in connection with strip measuring apparatus is well known and need not be described in any greater detail. Similarly, the means for mounting and moving the scanning apparatus and for controlling such movement is similarly well known.

However, it should be noted that the movable scanning employs, in conjunction with the support and drive means therefor, a switch 30 which is of any conventional electromechanical nature but which is disposed to change its state whenever the source and detector of the movable gauge 22 arrives at a preselected longitudinal line on the strip 10 such as, for example, the center line of the strip. This switch and the electrical signal produced by the operation of that switch, such as momentary closure thereof, appears on a conductor 31.

The electrical signals produced on conductors 21 and 25, which are normally in the nature of positive or negative varying DC analog signals having magnitudes representative of the thicknesses through which the associated radiation has passed, are connected to converter circuits 32 and 33, respectively. Circuits 32 and 33 are capable of accepting an analog voltage and producing an output consisting of a pulse the duration of which is proportional to the magnitude of the DC input signal. Such circuits are well known and are commonly referred to as analog to digital converters of the voltage to time interval type. Circuits of ramp-compare or dual-ramp variety can be employed. The pulse outputs from circuits 32 and 33 appear on conductors 34 and 35, respectively, and are employed to operate switching means 36 and 37, respectively, which are illustrated schematically as single-pole, single-throw switches which are closed during the pulse interval. Such switches would, normally constitute some kind of semiconductor switch, such as a transistor or the like, but are illustrated for simplicity as mechanical devices.

Circuits 32 and 33 also produce polarity signals on conductors 38 and 39, respectively, which signals indicate the polarity of the input DC signal received on conductors 21 and 25 respectively. The signals on conductors 38 and 39 are used to operate switching means 40 and 41, respectively, which switching means are illustrated as single-pole, double-throw switches which can be operated to connect switches 36 and 37 to either a positive or a negative source of DC voltage. Thus, if switch 40 is connected to the negative source as shown and switch 36 is closed for the interval during which the output pulse from circuit 32 exists, a constant amplitude negative pulse having the same duration as the converter output is produced. The outputs of the switching circuits connected to converters 32 and 33 are connected through summing resistors 42 and 43 which are connected to the negative input terminal of a conventional differential operational amplifier 44.

The operation of circuits 32 and 33 is further controlled in accordance with the strip velocity signal which appears on conductor 15 and which is connected to the input of a delay control circuit 45. As will be recognized, circuits 32 and 33 do not operate continuously but are caused to operate by a sample input control signal. Signals for these two circuits appear on conductors 46 and 47 and are produced by circuit 45 in accordance with the amplitude of the signal on conductor 15. As will be recognized, it is desirable to measure the thickness of strip 10 with gauges 18 and 22 on the same transverse line and to compare those measurements rather than comparing measurements which are longitudinally displaced by, for example, a matter of several inches or several feet. However, the gauges themselves are longitudinally displaced. Thus, it is necessary to delay one of the measuring operations a sufficient interval of time so that the transverse line moves from the upstream gauge to the downstream gauge. This delay is accomplished by circuit 45, depending upon the speed of the strip, by generating a pulse the duration of which is inversely in proportion to the magnitude of the signal on conductor 15. As the speed increases the magnitude of the signal on conductor 15 increases, which signal is applied, in inverted form, to a voltage controlled delay generator circuit which produces a pulse having a shorter duration.

A timing control pulse is provided by a monostable multivibrator 48, the trailing edge of the pulse being used to activate delay circuit 45 and to initiate the delay interval $T_d$. Because of the fact that detector 24 is the upstream detector and the output thereof is connected to converter 33, the delay circuit provides a gating signal on conductor 47 first. An output signal then appears on conductor 35, which signal is connected to switch 37, as described, and also the SET input of a bistable circuit 49. Subsequently, an output on conductor 46 to the RESET input of circuit 49 produces an output signal to the gate input of converter 32, permitting that circuit to produce its output signal on conductor 34.

The summed signals applied to differential amplifier 44 are integrated by that credit which includes a feedback capacitor 50 connected between the output and negative input terminals of the differential amplifier. A switching device 51 is connected in parallel circuit relationship with the capacitor and is controllable, in response to a signal from control logic circuit 52, to close and completely discharge the capacitor at the end of each measurement cycle. The positive input terminal of differential amplifier 44 is connected to ground so that the integrated signal constitutes that applied to the negative input terminal which is the difference between, or the algebraic sum of, the signals produced by the circuits controlled by converters 32 and 33.

The output of the integrator circuit including amplifier 44 is connected through a switching means 53 to the negative input terminal of a conventional differential amplifier 54, which is provided with a feedback capacitor 59 to form a sample-and-hold circuit, the positive input terminal of which is connected to ground. The output of amplifier 54 is connected through a summing resistor 55 to the input of an operational amplifier 56 which is provided with a negative feedback resistor 57 connected between the input and output terminals of the amplifier. The output of amplifier 56 is connected to an output terminal 58 at which the profile signal appears. Switching means 53 is also controlled by control logic circut 52.

The output of integrating amplifier 44 is also connected through an inverting amplifier 60 and a switching means 61 to the negative input terminal of a differential amplifier 62. The positive terminal of differential amplifier 62 is connected to ground and a capacitor 63 is connected between the output and the negative input terminals thereof, forming a sample-and-hold integrating amplifier. The output of the integrator is connected through a summing resistor 64 to the input of amplifier 56. It will be observed that switching means 61 is under the control of the SET output of a bistable circuit 65 which is controlled by the signal appearing on conductor 31, generated by center line switch 30, to enter its SET state, and which is reset by a timing signal from control logic 52.

The operation of the initial portions of the apparatus is believed to be relatively clear from the foregoing discussion but will now be discussed with reference to the wave form diagrams of FIGS. 2a–2i.

FIG. 2a shows a pulse 70 which is initiated by a timing signal from logic 52 and which represents the output of monostable multivibrator 48, the trailing edge of which initiates the delay interval $T_d$ and causes a signal to be produced on conductor 47, which causes the generation of an "upstream gauge" output from converter 33 as shown in FIG. 2c. Termination of that pulse sets bistable circuit 49, the SET output of which is shown in FIG. 2b. The trailing edge 71 of that pulse activates converter 32 and permits production of its "downstream gauge" output as shown in FIG. 2d. The interval $T_d$ is chosen so that the downstream converter samples a spot on the same transverse line as was examined by the up-converter. The samples thus derived are converted into pulses having durations representative of the magnitude and the duration and polarity signals are then used to activate switches 36, 37, 40 and 40 and 41.

The signals thus produced are applied through summing resistors 42 and 43 to the input of integrating amplifier 44. As previously described, the pulse output on conductor 35 closes switching means 37 to provide a fixed magnitude pulse of controlled duration through resistor 43 to integrating amplifier 44. This signal is integrated as shown in FIG. 2e to produce an output signal having a predetermined fixed slope 72, the level to which the signal arises being a function of the pulse duration. At the termination of pulse $T_p$ the output of integrator circuit 44 remains at a level 73 until bistable circuit 49 is reset and the pulse is produced by circuit 32 and conducted through resistor 42 to the input of the differential amplifier, whereupon the signal is integrated in the opposite direction producing a ramp 74 of fixed slope and a duration determined by the life of pulse $T_s$. Upon termination of pulse $T_s$ (FIG. 2d) the output of integrator circuit 44 remains at a level 75 which is then samples by closing switch 53, thereby transferring the output of the integrator through amplifier 54, the control signal from circuit 52 to close switch 53 being illustrated in FIG. 2f. This signal is retained by amplifier 54 and capacitor 59 is shown in FIG. 2g and is provided through resistor 55 to the input of operational amplifier 56.

What is claimed is:

1. In a thickness profile determining apparatus for use in examining a longitudinally moving web, the apparatus being of the type having first and second radiation producing means, first and second radiation receiving means, means for supporting the radiation producing and receiving means on opposite sides of a web to be examined thereby, means for transversely moving at least one of said means for supporting to permit transverse scanning of the web, and wherein said first and second receiving means each produce signals representative of the web thickness between the receiving means and its associated source, the improvement comprising first circuit means for sampling and combining the signals representative of web thickness to produce a signal representative of web thickness difference;

second circuit means for storing the difference signals produced by said first circuit means between samples and for providing said stored signals as a profile output signal;

logic circuit means for controlling the timing of said sampling;

means coupled to said means for transversely moving for producing an electrical coincidence signal whenever said pairs of radiation producing and receiving means are in position to examine the web on the same preselected longitudinal portion thereof;

circuit means responsive to said coincidence signal and to said logic circuit means for sampling and storing the next difference signal produced by said first circuit means and for providing said signal as a correction to said profile output signal.

2. An improved apparatus according to claim 1 wherein said first and second receiving means produce electrical signals having amplitudes representative of web thickness and wherein said first circuit means comprises first and second converters for producing pulses of variable duration proportional to the amplitudes of the scan input signals, and a third converter for integrating in opposite directions the pulses produced by said first and second converters to produce the signal representative of thickness difference.

3. An apparatus according to claim 1 and further comprising means responsive to the velocity of said longitudinally moving web for sequentially activating said first and second converters to sample their respective signals when examining substantially the same transverse portion of the web.

* * * * *